United States Patent
Lanz et al.

(10) Patent No.: US 11,103,967 B2
(45) Date of Patent: Aug. 31, 2021

(54) WORKPIECE SUPPORT FOR A MACHINE TOOL, AND MACHINE TOOL

(71) Applicant: Bystronic Laser AG, Niederönz (CH)

(72) Inventors: Ueli Lanz, Inkwil (CH); Christian Kähr, Suhr (CH)

(73) Assignee: Bystronic Laser AG, Niederönz (CH)

( * ) Notice: Subject to any disclaimer, the term of this patent is extended or adjusted under 35 U.S.C. 154(b) by 0 days.

(21) Appl. No.: 16/966,759

(22) PCT Filed: Jan. 31, 2019

(86) PCT No.: PCT/EP2019/000033
§ 371 (c)(1),
(2) Date: Jul. 31, 2020

(87) PCT Pub. No.: WO2019/149443
PCT Pub. Date: Aug. 8, 2019

(65) Prior Publication Data
US 2021/0039210 A1 Feb. 11, 2021

(30) Foreign Application Priority Data

Jan. 31, 2018 (DE) .......................... 102018000787.2

(51) Int. Cl.
*B23Q 1/03* (2006.01)
*B25H 1/02* (2006.01)

(52) U.S. Cl.
CPC .............. *B23Q 1/032* (2013.01); *B25H 1/02* (2013.01)

(58) Field of Classification Search
CPC .......... B23Q 1/03; B23Q 1/032; B23Q 1/037; B23Q 3/00; B23Q 3/102; B23Q 3/104;
(Continued)

(56) References Cited

U.S. PATENT DOCUMENTS 5,167,903 A * 12/1992 Anderson ................ B23K 7/10
266/49
7,759,608 B2 * 7/2010 LeMasson ........... B23K 26/702
219/121.82
(Continued)

FOREIGN PATENT DOCUMENTS

DE 102009013216 B3 8/2010
EP 0213235 A1 3/1987
(Continued)

OTHER PUBLICATIONS

English Language Translation of EP0213235 (A1).
(Continued)

*Primary Examiner* — Tyrone V Hall, Jr.
(74) *Attorney, Agent, or Firm* — Jacob Eisenberg

(57) ABSTRACT

This disclosure relates to a workpiece support for a machine tool having at least two parallel carriers which are spaced apart from one another, define a cutting grate space and multiple cutting grate elements arranged in the cutting grate space at right angles to the carriers. Each carrier has a support area for the cutting grate elements extending towards the cutting grate space. At least two cutting grate elements, each having two support surfaces facing the carriers for resting on the support areas of the two carriers. The undersides of the at least two cutting grate elements remaining next to the support surfaces in the area of the support areas and are set back from the support surfaces so that the at least two cutting grate elements rest only with the support surfaces. The at least two cutting grate elements each have two fixing elements.

9 Claims, 3 Drawing Sheets

(58) Field of Classification Search
CPC ............ B25H 1/02; B23K 37/04–0443; B23K 26/702
See application file for complete search history.

(56) References Cited

U.S. PATENT DOCUMENTS

| | | | |
|---|---|---|---|
| 9,789,573 B2* | 10/2017 | Forlong | ............... B23Q 1/03 |
| 2005/0116396 A1 | 6/2005 | LeMasson | |
| 2015/0174705 A1* | 6/2015 | Schwartz | ........... B23K 26/0876 |
| | | | 219/121.67 |

FOREIGN PATENT DOCUMENTS

| | | |
|---|---|---|
| EP | 1393847 A1 | 3/2004 |
| EP | 2471625 A2 | 7/2012 |
| EP | 2471625 A2 | 7/2012 |
| EP | 2626165 A1 | 8/2013 |
| WO | WO2009/024166 A1 | 2/2009 |
| WO | PCT/EP2019/00003 | 1/2019 |

OTHER PUBLICATIONS

Machine Language Translation of: EP1393847A1.
Machine Language Translation of: EP2626165A1.
Machine Language Translation of: WO2009/024166A1.
Machine Language Translation of: DE 102009013216B3.
Machine Language Translation of: PCT/EP2019/000033.

* cited by examiner

WORKPIECE SUPPORT FOR A MACHINE TOOL, AND MACHINE TOOL

CROSS REFERENCE TO RELATED APPLICATIONS

This application is a national phase of International Application No.: PCT/EP2019/000033, filed on 31 Jan. 2019, which claims priority to German Patent Application DE 102018 000 787.2 filed on 31 Jan. 2018. The contents of the above-references applications are expressly incorporated herein by reference to their entireties.

FIELD

The invention relates to a workpiece support for a machine tool and a machine tool, in particular a workpiece support for a machine tool and a machine tool. In particular, the invention relates to the reduction of torsional forces for a workpiece support such as a cutting table.

A machine tool is used to manufacture and machine workpieces using tools. Cutting machines, in particular jet cutting machines with a laser beam, water jet or plasma jet, are considered here as machine tools.

BACKGROUND

Workpiece supports such as cutting tables, are often mounted on rollers which are arranged at the bottom or with an underside and relatively far out on the longitudinal carriers of the cutting table. Cutting grate elements for storing the workpiece are fastened between the longitudinal carriers on support strips on an inner region of the longitudinal carriers.

Since the force transmission of the support strips and that of the rollers are offset from one another, there is a torque on the longitudinal carrier, which leads to undesired torsion or twisting of the longitudinal carriers.

For example, EP 2 626 165 A1 discloses in FIG. 2 a cutting table with conventional suspension of the grate rails, in which the side carriers of the cutting table can bend outwards under load.

WO 2009/024 166 A1 and DE 10 2009 013 216 133 disclose the attachment of support elements in a workpiece support of a machine tool, wherein cutting grates are attached to tubular carriers. This attachment is complicated or less tolerant to errors.

SUMMARY

The object of the invention is to avoid the disadvantages of the prior art and to provide an improved workpiece support for a machine tool or an improved machine tool.

This object is achieved by a workpiece support according to or a machine tool according to the claims.

The workpiece support according to the invention for a machine tool, in particular a cutting machine, for supporting a workpiece to be machined comprises two parallel carriers which, spaced apart from one another, define a cutting grate space, multiple cutting grate elements arranged in the cutting grate space at right angles to the carriers, wherein each carrier has a support area for the cutting grate elements extending towards the cutting grate space, wherein at least two cutting grate elements each have two support surfaces facing the carriers for resting on the support areas of the two carriers, wherein the undersides of the at least two cutting grate elements remaining next to the support surfaces in the area of the support areas are set back from the support surfaces so that the at least two cutting grate elements rest only with the support surfaces, and wherein the at least two cutting grate elements each have two fixing elements, each of which is spaced apart from the carrier by a distance smaller than the extent of the support surface from the carrier, so that the support surfaces are fixed on the support areas.

The workpiece support according to the invention proposes an attachment of at least the outer grids of a cutting grate package, said attachment being outside in the cutting grate space. This has the advantage that the torsional moments are reduced.

The distance between a support point of the workpiece support, such as a roller, and a support point of the cutting grate element is kept as small as possible. For this purpose, the outer support strips of the cutting grate elements are optimised so that they only rest on the outside, that is, on the outer edge of the carrier. The undersides of the cutting grate elements that remain next to the support surfaces are recessed in height in the region of the support areas from the support surfaces. The remaining undersides can be recessed upwards, i.e. in the direction of the cutting grate space. Likewise, the remaining undersides can be recessed downwards and then form the fixing elements there, for example.

It can further be provided that the support area is formed by a support profile having an inner leg arranged further in the cutting grate space and an outer support area arranged directly on the carrier, wherein the support surfaces only rest on the outer support area. The fact that the support surfaces rest only on the outer support area reduces the torque or torsional force applied to the carrier. The support profile can for example be a U-shaped profile or a tube with recesses such as slots.

It can be provided that the fixing elements engage in the support profile. The fixing elements therefore have two functions. On the one hand, the cutting grate elements are secured against displacement and, on the other hand, they prevent the carriers from moving apart, that is to say bending apart. The fixing elements can be designed like a tongue or tab and engage in the profile or tube.

It can be provided that the fixing elements enter into a positive or almost positive connection with an inner region of the support profile. In this way, the locations or points of the force transmission and the lateral displacement protection are spatially and functionally separated from one another, which enables optimisation of each.

It can be provided that the support profile is designed as a profile or tube and the pin receptacles as slots for receiving the pins of the cutting grate elements. This allows simple manufacture and good handling of the cutting grate elements when inserted into the support profile.

It can be provided that the support profile is designed as a profile or tube with slots for receiving the two cutting grate elements and that the profile or tube is attached to the carrier, wherein a stiffening plate is arranged between the profile or tube and the carrier. The stiffening plate increases the torsional rigidity of the longitudinal carrier.

It can also be provided that rollers are provided on the carriers in a lower region. The flexibility of the operation can be increased by moving the cutting table.

It can be provided that the two cutting grate elements are outer cutting grate elements of a cutting grate package and that inner cutting grate elements of the cutting grate package do not rest on the support areas. Several cutting grate packages can be provided per table, which enables a modular structure and also replacement. The inner grates do not rest, so that no additional moments or torsional forces are applied to the carrier. There is a difference in height of the support edges of the inner and outer cutting grate elements.

It can be provided that the support profile is designed as a tube with slots for receiving the two outer cutting grate elements and that the inner cutting grate elements each have two support surfaces arranged directly on the carriers for support on an upper side of the tube. The fact that, in addition to the two outer cutting grate elements, the inner cutting grate elements also rest results in a better weight and force distribution. In order to reduce the moments, the inner cutting grate elements rest directly on the carriers, i.e. as far as possible towards the outside.

The machine tool according to the invention, in particular a cutting machine, comprises a workpiece support as described above for supporting a workpiece to be machined. The same advantages and modifications apply as described above.

Further preferred embodiments of the invention will become apparent from the remaining features mentioned in the dependent claims.

The various embodiments of the invention mentioned in this application can, unless otherwise stated in individual cases, be advantageously combined with one another.

BRIEF SUMMARY OF THE DRAWINGS

The invention will be explained below in exemplary embodiments with reference to the accompanying drawings, In the figures.

DETAILED DESCRIPTION

Figure 1:
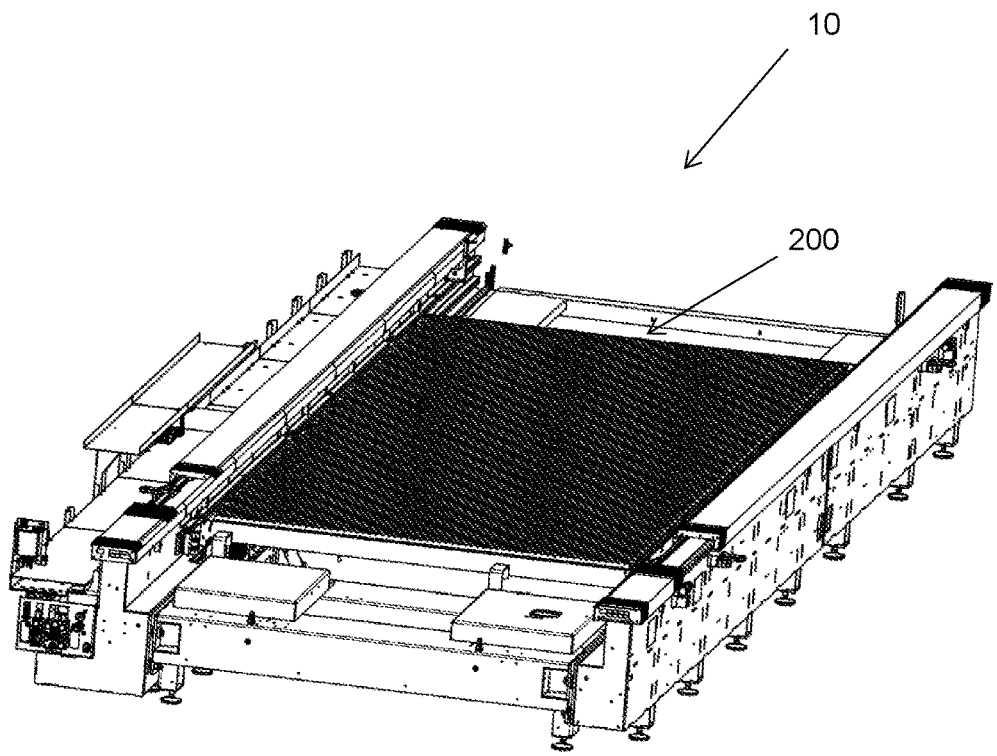
FIG. 1 shows a schematic perspective view of a machine tool having a cutting table.

FIG. 1 shows a schematic perspective view of a machine tool 10 having a workpiece support or a cutting table 200 for receiving workpieces, not shown here, which are processed, for example cut, by the machine tool 10. The machine tool 10 is, for example, a cutting machine, in particular a jet cutting machine with a laser beam, water jet or plasma jet.

Figure 2:
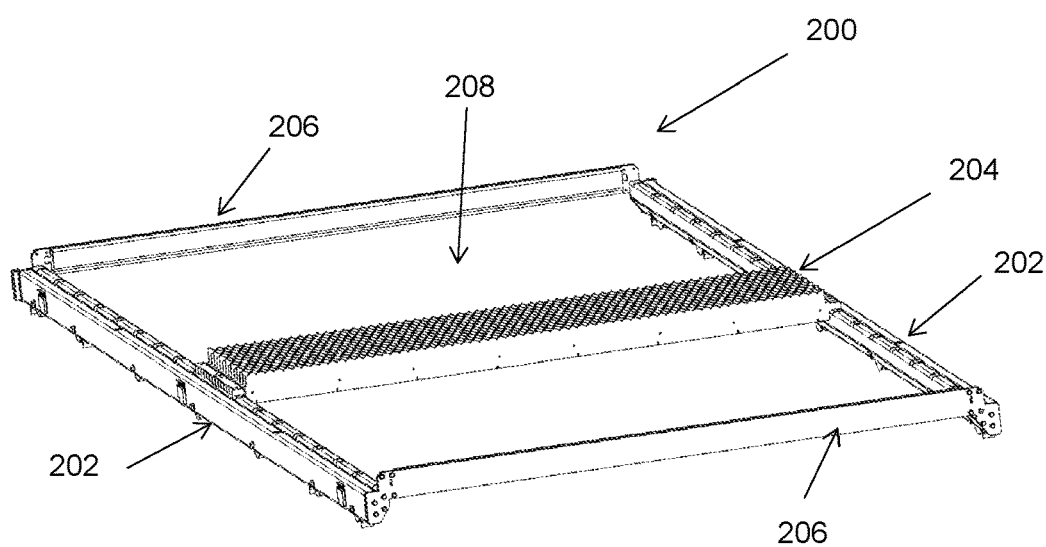
FIG. 2 shows a perspective view of the cutting table.

FIG. 2 shows a perspective view of the cutting table 200. The cutting table 200 comprises two parallel longitudinal carriers 202 that are spaced apart from one another. Multiple cutting grate packages 204, which together form a cutting grate, are provided between the two longitudinal carriers 202. The cutting grate packages 204 each consist of multiple cutting grate elements. The cutting grate elements are mounted on the longitudinal carriers 202 and run substantially perpendicular to said carriers, that is to say in a transverse direction. To stabilise the cutting table 200, it can have transverse carriers 206 on one or both ends, for example. A cutting grate space 208 is defined between the longitudinal carriers 202, in which a workpiece which is mounted on the cutting grate packages 204 is processed.

Figure 3:
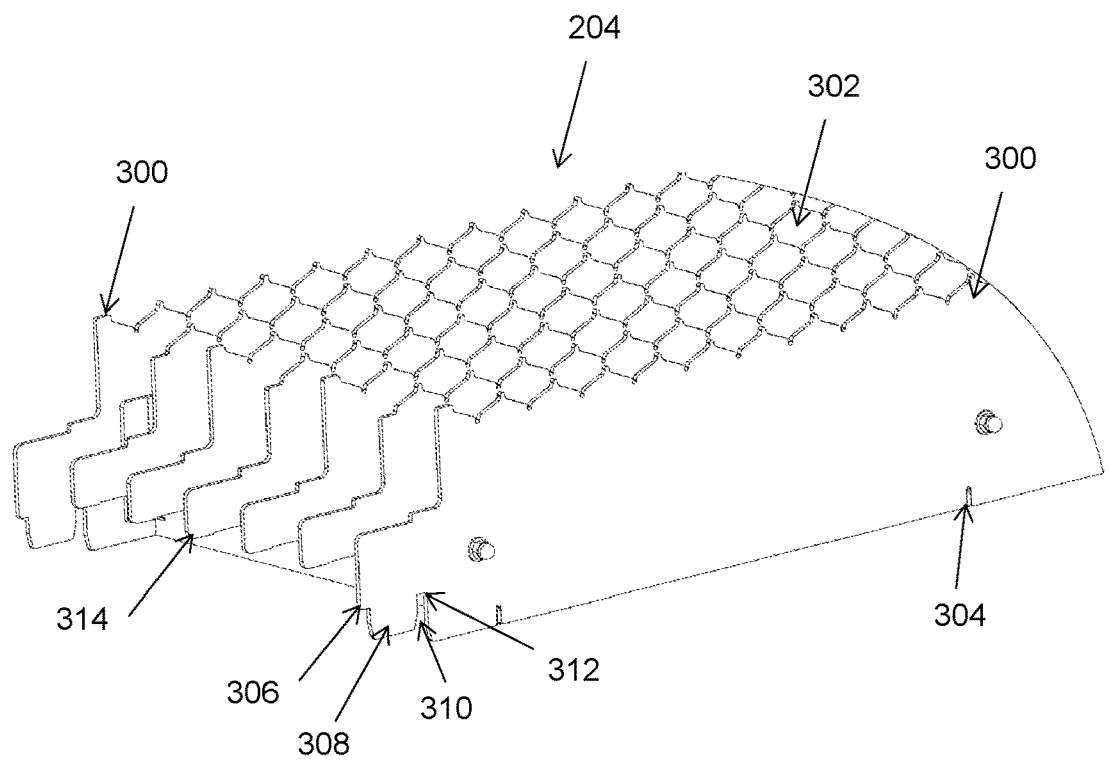
FIG. 3 shows a perspective detailed view of a cutting grate package.

FIG. 3 shows a perspective detailed view of the cutting grate package 204. The cutting grate package 204 has two outer cutting grate elements 300. Inner cutting grate elements 302 are arranged between the two outer cutting grate elements 300. The cutting grate elements 300 and 302 are connected to one another by means of at least one holder 304 and held at a defined distance from one another.

The outer cutting grate element 300 has a support surface 306 arranged at the outer end for resting on a longitudinal carrier. The support surface 306 is dimensioned relatively short in order to achieve a punctiform support as close as possible to the longitudinal carrier. The length of the support surface 306 can correspond to 2 to 10 times, preferably 3 to 7 times, the material thickness of the outer cutting grate element 300.

A fixing element in the form of a pin or a tab 308 adjoins the support surface 306 further inwards, that is to say in the direction of the cutting grate space. This tab 308 protrudes downward from the support surface 306. For example, the tab 308 is bevelled at 15° on both sides. Further inward, there is a recess 310 which, together with the tab 308, serves to laterally fix the outer cutting grate element 300 and thus the cutting grate package 204. The recess 310 extends upwards to an end surface 312.

There is a difference in height between the support surface 306 and the end surface 312. The end surface 312 is higher than the support surface 306 so that when the outer cutting grate element 300 is supported on an even profile, only the support surface 306 rests and the end surface 312 remains free. The height difference can be in a range between one hundredth and 5 tenths, preferably one tenth, of the material thickness of the outer cutting grate element 300. The details of the one end of the outer cutting grate element 300 described here are identical to the other end of the outer cutting grate element 300.

The inner cutting grate element 302 can also have a support surface 314. The support surface 314 is configured similarly to the support surface 306 of the outer cutting grate element 300. In particular, the support surface 314 is arranged at the outer end of the inner cutting grate element 302. A recess or undercut adjoins the support surface 314 on the inside so that it is ensured that only the support surface 314 rests on a carrier. In this example, the height of the support surface 314 is higher than that of the support surface 306. For example, the support surface 314 can thus rest on a tube of the longitudinal carrier while the support surface 306 rests in a recess or a slot in the longitudinal carrier. The height of the support surface 314 may alternatively correspond to the height of the support surface 306.

Figure 4:
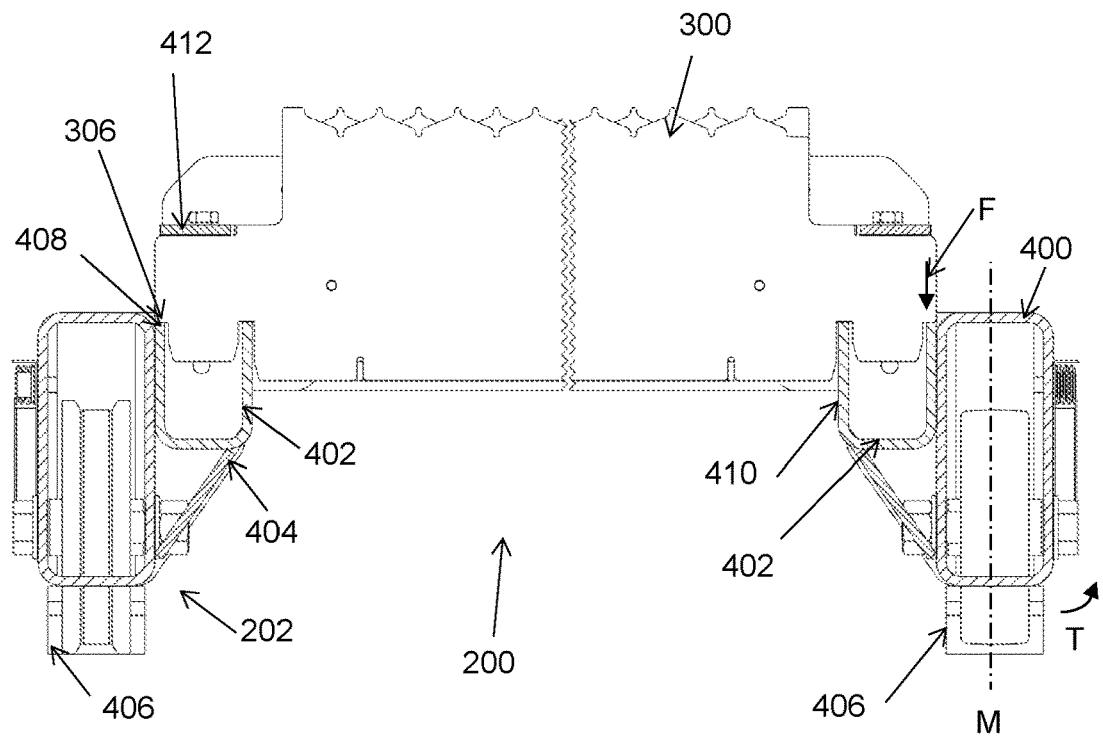
FIG. 4 shows a first sectional view of the cutting table.

FIG. 4 shows a sectional view of the cutting table 200 through the longitudinal carriers 202. The longitudinal carrier 202 comprises an external square tube 400 and a smaller, internal square tube 402, which is fastened to the square tube 401, for example, by welding. A stiffening plate 404 serves to support the square tube 402 on the square tube 400. Rollers 406 for moving the cutting table 200 are arranged in the external square tube 400.

In the internal square tube 402, pin receptacles formed as slots are introduced, into which the pins or tabs 308 of the outer cutting grate elements 300 engage. Through the slot or cut, a support area 408 for the support surface 306 of the outer cutting grate element 300 is formed by an outer leg of the inner square tube 402. The slot or cut extends, for example, up to half of the inner square tube 402. The support area 408 is formed at the lower end of the slot or cut. An inner leg 410 of the inner square tube 402 projects into the recess 310 of the outer cutting grate element 300. The height of the recess 310 and of the inner leg 410 are dimensioned such that the outer cutting grate element 300 does not rest on the inner leg 410, but is spaced apart therefrom.

The force F which is introduced into the longitudinal carrier 202 by the outer cutting grate element 300 is transmitted exclusively via the support surfaces 306 and the support areas 408. Since this power transmission is as close as possible to a perpendicular M through the point of contact of the roller 406, the resulting torsional moment T is as low as possible.

Furthermore, the recess 310 and the inner leg 410 serve to secure against displacement for fixing the cutting grate element 300 between the longitudinal carriers 202. Furthermore, the two longitudinal carriers 202 are secured against being pressed apart by the engagement of the tabs 308 in the square tubes 402.

The cutting grate package is secured in the vertical direction by means of a screwed holding plate 412.

Figure 5:
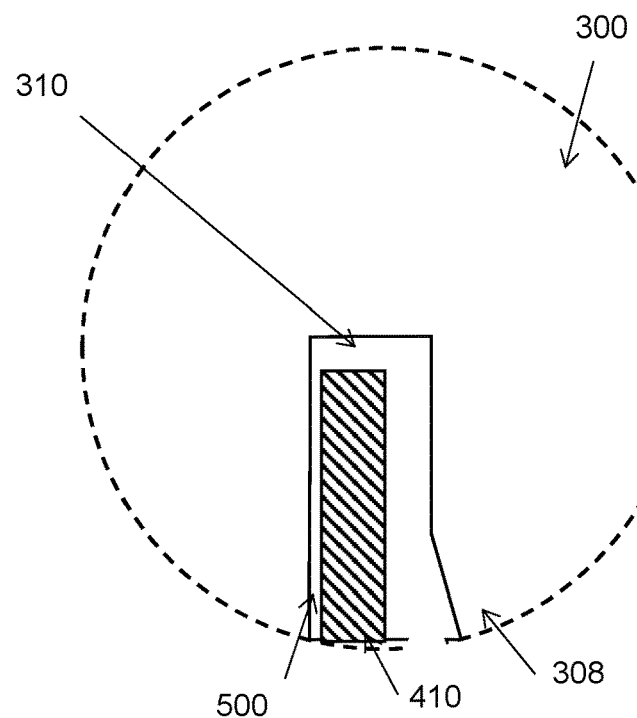
FIG. 5 shows a detailed view of a safety device of the cutting grate package.

FIG. 5 shows a detailed view of a safety device of the cutting grate package or of the cutting grate element 300. As can be clearly seen, there is an air gap between the top of the inner leg 410 and the recess 310 so that the cutting grate element 300 does not rest on the inner leg 410 of the longitudinal carrier 402.

The recess 310 serves to secure the cutting grate element 300 or the cutting grate package against displacement in the transverse direction. The securing ensures that the support surfaces 306 always rest on the support areas 408. This is achieved in that fixing elements, such as the pins or tabs 308 and/or an inner surface 500, form a positive or almost positive connection with the inner leg 410.

FIG. 5 shows an almost positive connection; there is a narrow air gap between the inner leg 410 and the inner surface 500 of the cutting grate element 300. Since this configuration is present on both sides of the cutting grate element 300, the cutting grate element 300 is secured against displacement. In the case of a positive connection, the inner surface 500 would rest on the inner leg 410.

Figure 6:
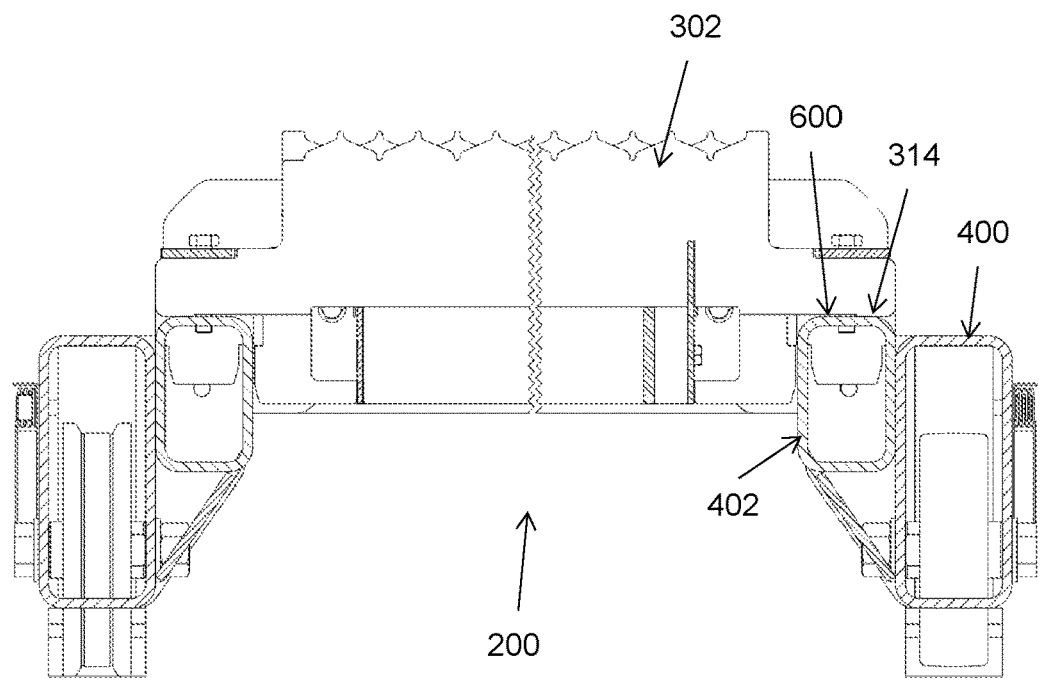
FIG. 6 shows a second sectional view of the cutting table.

FIG. 6 shows a second sectional view of the cutting table 200, and namely offset from the view in FIG. 4 such that an inner cutting grate element 302 is shown. Since the view in FIG. 6 largely corresponds to the view in FIG. 4, only the differences are referred to below to avoid repetitions.

The sectional view shows the longitudinal carrier 402 not in the cut state. The longitudinal carrier 402 is closed accordingly and has an upper surface 600. The inner cutting grate element 302 with a support surface 314 rests on this upper surface 600. The support surface 314 is arranged and dimensioned analogously to the support surface of the outer cutting grate element in such a way that it is arranged as far as possible outside, that is to say as close as possible to the outer longitudinal carrier 400. This also minimises those moments which are introduced by the inner cutting grate elements 302. Since the inner cutting grate elements 302 are suspended between and supported by the outer cutting grate elements 300, a large part of the force transmission and thus the generation of the torque or the torsional force takes place through the outer cutting grate elements.

The workpiece support 200 or machine tool 10 shown here allows workpieces to be processed with a minimised torsional force on the carrier of the workpiece support 200.

The invention claimed is:

1. A workpiece support for a machine tool for supporting a workpiece to be machined having, the workpiece support comprising:

at least two parallel carriers which, spaced apart from one another, define a cutting grate space, multiple cutting grate elements arranged in the cutting grate space at right angles to the carriers, wherein each carrier has a support area for the cutting grate elements extending towards the cutting grate space, wherein at least two cutting grate elements each have two support surfaces facing the carriers for resting on the support areas of the two carriers, wherein the undersides of the at least two cutting grate elements remaining next to the support surfaces in the area of the support areas are set back from the support surfaces so that the at least two cutting grate elements rest only with the support surfaces, wherein the at least two cutting grate elements each have two fixing elements, each of which is spaced apart from the carrier by a distance smaller than the extent of the support surface from the carrier, so that the support surfaces are fixed on the support areas, wherein the support area is formed by a support profile with an inner support area arranged further in the cutting grate space and an outer support area arranged directly on the carrier, wherein the support surfaces rest only on the outer support area, and wherein the fixing elements are formed as pins, which conically taper in particular starting from their base on the cutting grate element and engage in pin receptacles of a support profile.

2. The workpiece support according to claim 1, wherein the fixing elements engage in the support profile.

3. The workpiece support according to claim 1, wherein the fixing elements enter into a positive or almost positive connection with an inner region of the support profile.

4. The workpiece support according to claim 1, wherein the support profile is a profile or tube and the pin receptacles as slots for receiving the pins of the cutting grate elements.

5. The workpiece support according to claim 1, wherein the support profile is a profile or tube with slots for receiving at least two cutting grate elements and that the profile or tube is attached to the carrier, wherein a stiffening plate is arranged between the profile or tube and the carrier.

6. The workpiece support according to claim 1, wherein the rollers are provided on the carriers in a lower region.

7. The workpiece support according to claim 1, wherein the two cutting grate elements are outer cutting grate elements of a cutting grate package and that inner cutting grate elements of the cutting grate package do not rest on the support areas.

8. The workpiece support according to claim 7, wherein the support profile is a tube with slots for receiving the two outer cutting grate elements and that the inner cutting grate elements each have two support surfaces arranged directly on the carriers for support on an upper side of the tube.

9. The workpiece supposed according to claim 1, wherein the machine tool is a cutting machine having a workpiece support for supporting a workpiece to be machined.

* * * * *